United States Patent [19]
Leinweber et al.

[11] Patent Number: 5,174,191
[45] Date of Patent: Dec. 29, 1992

[54] PNEUMATICALLY ACTUATABLE LINEAR DRIVE FOR AUTOMATIC SPOT WELDING MACHINES

[75] Inventors: Lothar Leinweber, Biedenkopf-Kombach; Georg Gaudier, Biedenkopf-Ludwigshuette, both of Fed. Rep. of Germany

[73] Assignee: VBS Vertriebsgesellschaft für Schweisstechnik mbH, Biedenkopf-Wallau, Fed. Rep. of Germany

[21] Appl. No.: 728,389

[22] Filed: Jul. 11, 1991

[30] Foreign Application Priority Data

Jul. 11, 1990 [DE] Fed. Rep. of Germany ... 9010446[U]

[51] Int. Cl.⁵ ............................................. F15B 11/00
[52] U.S. Cl. ...................................... 91/519; 91/520; 91/525; 91/535; 91/181; 91/189 R
[58] Field of Search ..................... 91/181, 189 R, 519, 91/520, 525, 535

[56] References Cited

U.S. PATENT DOCUMENTS

| | | | |
|---|---|---|---|
| 2,661,599 | 12/1953 | Folmer | 91/519 X |
| 3,657,509 | 4/1972 | Beneteau | 219/120 |
| 4,410,193 | 10/1983 | Howard | 60/415 X |
| 4,700,611 | 10/1987 | Kaneko | 91/519 X |
| 4,748,894 | 6/1988 | Foster | 91/189 R X |

FOREIGN PATENT DOCUMENTS

3542069 12/1986 Fed. Rep. of Germany .

*Primary Examiner*—Edward K. Look
*Assistant Examiner*—Todd Mattingly
*Attorney, Agent, or Firm*—Laurence A. Greenberg

[57] ABSTRACT

A pneumatically actuatable linear drive for automatic spot welding machines includes a cylinder, a piston rod with segments and pistons and an intermediate bottom between the pistons for dividing the cylinder into pressure chambers. An axial conduit in the segments has a check valve. Radial conduits communicate between the axial conduit and the pressure chambers. Air line connections and a throttle valve lead into the pressure chambers. One piston on one segment moves toward and away from the closed end into end and terminal positions for closing and opening the radial conduits. The end and terminal positions of the one piston are determined by a cap screw of the check valve having an axially parallel conduit and by a spring on one of the segments. A connecting conduit contains the throttle valve. The intermediate bottom has a peripheral annular conduit communicating with one of the air line connections and through the connecting conduit with one of the pressure chambers. The intermediate bottom has a slide cylinder being open toward two of the pressure chambers. A ventilation conduit in the intermediate bottom connects the second pressure chamber to the annular conduit and intersects the slide cylinder. A ventilation slide is axially movable as a function of pressure differences between the second pressure chamber and the third pressure chamber for blocking off the ventilation conduit.

4 Claims, 1 Drawing Sheet

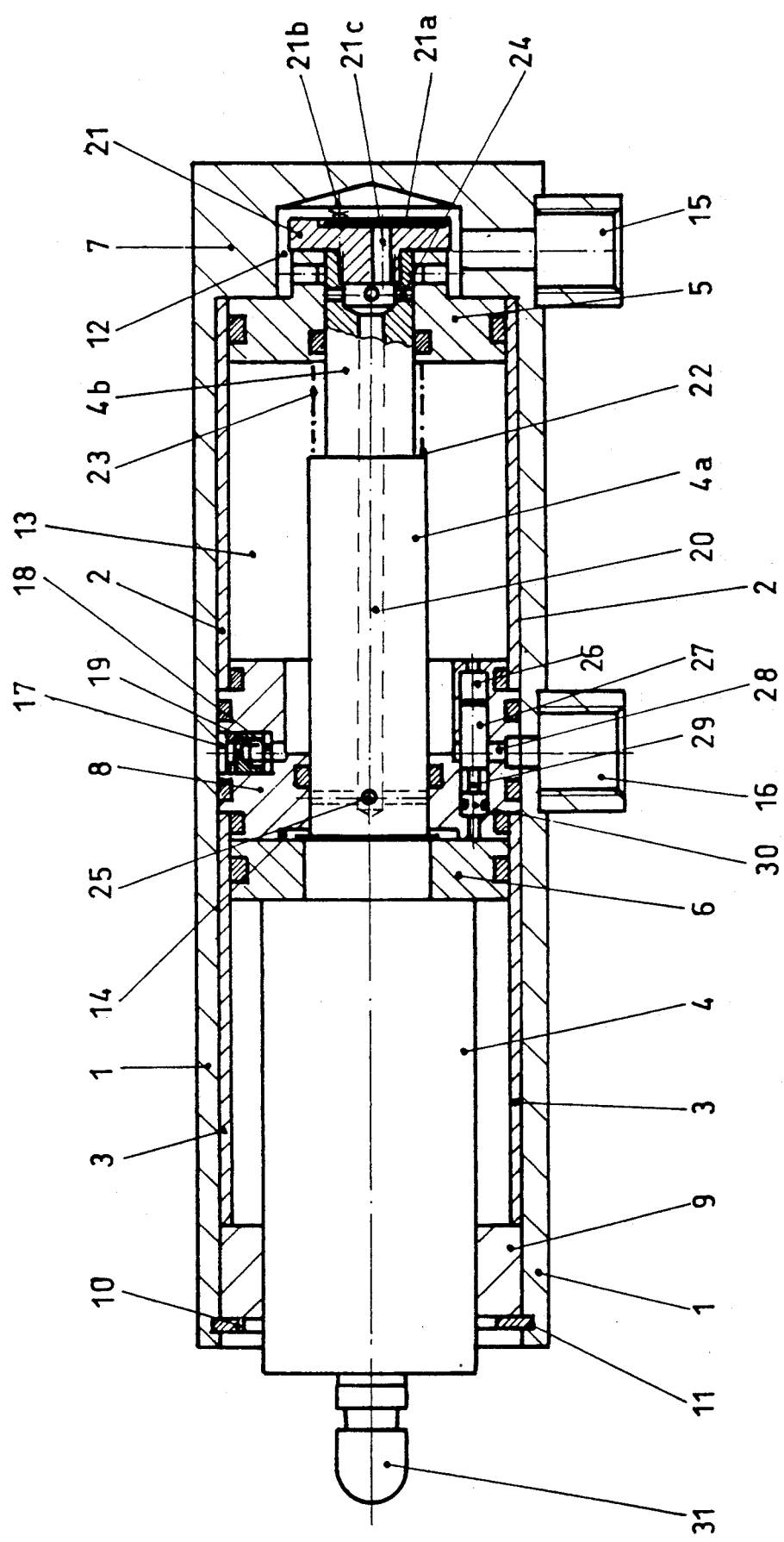

PNEUMATICALLY ACTUATABLE LINEAR DRIVE FOR AUTOMATIC SPOT WELDING MACHINES

BACKGROUND OF THE INVENTION

1. Field of the Invention

The invention relates to a pneumatically actuatable linear drive for automatic spot welding machines or robots having a plurality of pistons guided in a tandem configuration on a piston rod and disposed in a cylinder which is closed at one end by a cylinder bottom and has a guide ring penetrated by the piston rod at its other end region; between each two adjacent pistons is an intermediate bottom attached to the cylinder and penetrated by the piston rod, so that the cylinder is divided into at least three pressure chambers, namely a first pressure chamber located between the cylinder bottom and the first piston adjacent to it, a second pressure chamber located between the first piston and the intermediate bottom adjacent to it, and a third pressure chamber located between the second piston and the intermediate bottom; the piston rod includes a segment extending between the pistons having an axial conduit with an end oriented toward the cylinder bottom having a check valve and discharging through the check valve into the first pressure chamber, the axial conduit can be connected through radial conduits to the first and the third pressure chambers, the cylinder has two air line connections, the first of which leads into the first pressure chamber and can communicate with the third pressure chamber, while the second of which leads into the second pressure chamber through a throttle valve; the first piston is axially movably disposed on an end segment of the piston rod having a lesser diameter, and in its end position toward the cylinder bottom it closes the radial conduits leading out of the axial conduit of the piston rod into the first pressure chamber, while in its terminal position remote from the cylinder bottom it opens these conduits.

2. Description of the Related Art

A linear drive having such characteristics is known from German Published, Non-Prosecuted Application DE 35 42 069 A1. The known apparatus has the object of braking an electrode motion in a direction toward a workpiece in order to reduce production of noise upon application of the electrodes. The time loss brought about by the delaying procedures is negligibly low.

In the known apparatus, this object is intended to be attained by a piston 7 adjacent to a second pressure chamber 20 being axially displaceable over a reduced diameter region 9' of a shaft 9 as a function of a pressure difference between a first and the second pressure chambers 18, 20. The displacement is between a first position, in which it covers a connecting line 17 surrounding a valve 15, between a conduit 16 and the second pressure chamber 20, and a second position, in which it uncovers the connecting line 17. In its second position, it rests on a shoulder 10 of the shaft 9.

Although the stated object can be attained by such a piston-cylinder configuration, nevertheless, particularly in the embodiment shown and described in the specification as an exemplary embodiment, it has a disadvantage which is that it is structurally very complicated and therefore very expensive to manufacture. Another disadvantage is that the throttle configuration located laterally of the cylinder considerably increases the total amount of space required for the linear drive of the welding electrode. That has a disadvantageous effect in terms of the possible uses of the welding robot, because welding tongs, with their drive mechanism, can no longer be guided through very tight spaces.

A functional disadvantage is that in order to reach its initial position in which it closes off the radial connecting conduits from the first pressure chamber to the axial conduit of the piston rod, the piston, which is axially movable over an inner end segment of the piston rod, is completely dependent on the pressure difference between the first and second pressure chambers. If this pressure difference should not suffice to displace the piston into its end position toward the cylinder bottom, then when the next working stroke begins both pistons may be acted upon simultaneously, so that the damping effect that is sought is prevented.

It is accordingly an object of the invention to provide a pneumatically actuatable linear drive for automatic spot welding machines, which overcomes the hereinafore-mentioned disadvantages of the heretofore-known devices of this general type and which does so in such a way that the structure is simpler, while cast parts are avoided and reliable functioning is assured.

SUMMARY OF THE INVENTION

With the foregoing and other objects in view there is provided, in accordance with the invention, a pneumatically actuatable linear drive for automatic spot welding machines, comprising a cylinder having ends, a piston rod, first and second pistons guided in tandem on the piston rod in the cylinder, a cylinder bottom closing one of the ends of the cylinder, a guide ring being disposed in the vicinity of the other of the ends of the cylinder and being penetrated by the piston rod; an intermediate bottom being attached to the cylinder between the pistons and being penetrated by the piston rod, the cylinder being divided into at least a first pressure chamber between the cylinder bottom and the first piston, a second pressure chamber between the first piston and the intermediate bottom, and a third pressure chamber between the second piston and the intermediate bottom; the piston rod having a first segment and a second end segment extending between the pistons, an axial conduit being disposed in the segments and having an end facing toward the cylinder bottom, a check valve disposed at the end of the axial conduit for conducting a discharge from the axial conduit into the first pressure chamber, radial conduits communicating between the axial conduit and the first and third pressure chambers, a throttle valve, the cylinder having a first air line connection leading into the first pressure chamber and communicating with the third pressure chamber, and a second air line connection leading into the second pressure chamber through the throttle valve; the second end segment having a smaller diameter than the first segment defining a shoulder between the segments, the first piston being disposed on the second end segment for axial movement toward the cylinder bottom into an end position closing the radial conduits leading out of the axial conduit into the first pressure chamber and away from the cylinder bottom into a terminal position opening the radial conduits leading out of the axial conduit into the first pressure chamber, a helical compression spring axially surrounding the second end segment with prestressing between the first piston and the shoulder; the check valve having a housing disposed on the second end segment in the form of a cap screw with an axially parallel conduit disposed therein; the end position of movement of the first piston toward the cylinder bottom being determined by the housing, and the terminal position of movement of the first piston away from the cylinder bottom being defined by a maximum compression of the helical compression spring; a connecting conduit containing the throttle valve, at least the intermediate bottom having a peripheral annular conduit communicating directly with the second air line connection and communicating through the connecting conduit with the second pressure chamber; at least the intermediate bottom having a peripheral region with an at least approximately axially parallel extending slide cylinder being open toward the second and third pressure chambers, a ventilation conduit extending in the intermediate bottom, connecting the second pressure chamber to the annular conduit and intersecting the slide cylinder, and a ventilation slide being axially movable as a function of pressure differences between the second pressure chamber and the third pressure chamber for blocking off the ventilation conduit.

In accordance with another feature of the invention, the cylinder has an axis, the cap screw is a valve seat for the check valve, and the check valve is a diaphragm valve disposed on the second end segment of the piston rod having a diaphragm disposed on the valve seat perpendicular to the axis of the cylinder.

In accordance with a concomitant feature of the invention, the slide cylinder has a given cross section, the ventilation slide is a cylinder filling the given cross section and having an end surface facing toward the third pressure chamber, and there is provided a thrust piston being axially movable in axial extension in the slide cylinder, and a spacer pin positioned axially against the end surface and connecting the ventilation slide to the thrust piston.

Accordingly, a helical compression spring coaxially surrounding the piston rod is disposed on the lesser diameter end segment of the piston rod, while the spring is supported with initial stress on the shoulder defining the end portion of lesser diameter of the piston rod and on the rear side of the piston that is axially movable on this piston rod segment. This assures that in its initial position this piston always closes off the radial connecting conduits leading from the axial conduit of the piston rod from the first pressure chamber upon the onset of the working stroke.

Since the apparatus through which the second pressure chamber is ventilated in the working stroke is accommodated completely in the intermediate bottom, the linear drive occupies substantially less space, so that the possible uses of welding tongs being driven in this way are expanded.

The shutoff device disposed in the ventilation path as a cylindrical slide, which is controlled by the pressure differences between the second and third pressure chambers, effects a considerable simplification as compared with the cutoff device that is constructed as a ball valve in the known piston-cylinder configuration.

Through the use of the check valve disposed on the end of the piston rod toward the cylinder bottom and blocking off the axial conduit of the piston rod from overpressure in the first pressure chamber, as a diaphragm valve with a diaphragm disposed perpendicularly to the cylinder axis, it is possible to minimize the axial structural length required for this check valve.

Other features which are considered as characteristic for the invention are set forth in the appended claims.

Although the invention is illustrated and described herein as embodied in a pneumatically actuatable linear drive for automatic spot welding machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The drawing is a diagrammatic, partly broken-away, axial-sectional view of a linear drive in a position of repose, with a piston rod fully retracted.

DESCRIPTION OF THE PREFERRED EMBODIMENT

Referring now to the figures of the drawing in detail and first, particularly, to FIG. 1 thereof, there is seen an exemplary embodiment of the linear drive according to the invention which substantially includes a cylinder or cylinder jacket 1 that is lined with a bushing having of a plurality of segments 2, 3. A piston rod 4 having first and second pistons 5, 6 guided thereon in a tandem configuration, is axially movable inside the bushing.

The cylinder jacket 1 is closed at one end by a solid cylinder bottom 7. Disposed between the two pistons 5, 6 is an intermediate bottom 8, which is penetrated by a first segment 4a of the piston rod extending between the two pistons 5, 6. It is retained in a fixed position with respect to the cylinder jacket between the two segments 2, 3 of the bushing. A guide ring 9 which is penetrated by the piston rod 4 is disposed in the end of the cylinder jacket 1 facing away from the cylinder bottom 7. The inside of the guide ring 9 is located on the outer segment 3 of the bushing and the outside of the guide ring 9 is retained by a snap ring 10 seated in an annular groove 11 in the cylinder jacket 1. The inside cross section of the guide ring 9 is polygonal so that non-illustrated axial ventilation conduits are present between the piston rod 4 and the guide ring 9.

The cylinder jacket 1 is subdivided into three pressure chambers, namely a first pressure chamber 12 located between the cylinder bottom 7 and the first piston 5, a second pressure chamber 13 located between the first piston 5 and the intermediate bottom 8, and a third pressure chamber 14 located between the second piston 6 and the intermediate bottom 8.

A first air line connection 15 is disposed on the cylinder bottom 7 and leads directly into the first pressure chamber 12. A second air line connection 16 is disposed in the vicinity of the intermediate bottom 8. The second air line connection 16 leads through an annular conduit 17 surrounding the intermediate bottom 8 into the second pressure chamber 13, and a throttle valve 19 is disposed in a connecting conduit 18 leading from the annular conduit 17 to the second pressure chamber 13.

The piston rod 4 has a segment extending between the two pistons 5, 6 in which an axial conduit 20 is disposed. The conduit 20 has an outlet with a mouth facing toward the cylinder bottom which discharges into the first pressure chamber 12. A check valve 21 that closes upon overpressure in the first pressure chamber 12 is disposed at the mouth of the conduit 20 as a closing body, with a diaphragm 21a disposed parallel to the cylinder bottom 7. The valve has a seat or housing that is constructed as a cap screw 21b, which is screwed coaxially into a second end segment 4b of the piston rod. The cap screw 21b has an axially parallel conduit 21c and a screw protruding laterally past the end segment 4b of the piston rod.

The inside of the cylinder bottom 7 has a central turned recess which forms a part of the first pressure chamber 12 and into which the end segment 4b of the piston rod having the check valve 21 protrudes, in a position of repose of the linear drive with the piston rod retracted fully.

The segment 4a of the piston rod extending between the two pistons 5, 6 has a lesser diameter than the end segment 4b. A transition between the two segments forms a shoulder 22. The first piston 5 is axially movably disposed on the end segment 4b of the piston rod, and a helical compression spring 23 is disposed with initial stress on the end segment 4b between the first piston 5 and the shoulder 22. In the position of repose of the linear drive with the piston rod fully retracted, the helical compression spring 23 presses the first piston 5 against the cylinder bottom 7. In this position, the second piston 6 rests on the intermediate bottom 8.

Below the check valve 21, radial conduits 24 lead out of the axial conduit 20 of the piston rod. In the position of repose of the linear drive, the radial conduits 24 are located inside the first piston 5. However, they are opened and then discharge into the first pressure chamber 12, whenever the first piston 5 is driven inward counter to the action of the helical compression spring 23.

Radial conduits 25 are likewise provided at the other end of the axial conduit 20. When the piston rod is fully retracted, they are located inside the intermediate bottom 8 and are thus closed. However, they are opened and then discharge into the third pressure chamber 14, whenever the piston rod 4 is driven outward by a short distance.

A peripheral region of the intermediate bottom 8 includes an axially parallel-extending slide cylinder 26, which is open on one end toward the second pressure chamber 13 and is open on the other toward the third pressure chamber 14. Disposed in this slide cylinder is a ventilation slide 27 that is axially movable as a function of the pressure differences between the second pressure chamber 13 and the third pressure chamber 14. A ventilation conduit 28 connects the second pressure chamber 13 to the annular conduit 17. The ventilation slide 27 can shut off the ventilation conduit 28 and in so doing intersects the slide cylinder 26. The ventilation slide 27 has an end surface facing toward the third pressure chamber 14, at which a spacer pin 29 positioned axially against the end surface connects the ventilation slide 27 to a thrust piston 30 that in axial extension is axially movable in the slide cylinder 26.

Beginning at the position of repose, in which the first piston 5 rests on the cylinder bottom 7, the linear drive according to the invention functions as follows:

The first pressure chamber 12 is acted upon by compressed air through the air line connection 15. The compressed air thus initially presses only upon the first piston 5 and the check valve 21, which is kept closed by the air pressure. The piston rod 4, with an electrode 31 located on its outer end, is moved toward a workpiece until the electrode 31 strikes the workpiece. In this process, the radial conduits 25, which are initially kept closed by the intermediate bottom 8, are unblocked to the axial conduit 20 of the piston rod. The radial conduits 24 located on the other end of the axial conduit 20 are initially still kept closed by the first piston 5, because the pre-stressed helical compression spring 23 still keeps the first piston 5 in its initial position.

In this preliminary stroke, the second compression chamber 13 is vented through the connecting conduit 18, which discharges into the annular conduit 17 located on the periphery of the intermediate bottom 8. The annular conduit 17 in turn communicates with the second air line connection 16. The motion of the electrode 31 toward the workpiece is braked by the throttle valve 19 located in the connecting conduit 18, and as a consequence the electrode 31 strikes the workpiece without substantial noise.

Compressed air continues to be supplied to the first pressure chamber 12. The first piston 5 is then displaced on the end segment 4b of the piston rod into the second pressure chamber 13, counter to the action of the helical compression spring 23, until the helical compression spring 23 has been maximally compressed. In this process, the radial conduits 24 are opened to the axial conduit 20 of the piston rod. The compressed air then flows around the check valve 21 through the radial conduits 24, the axial conduit 20 and the radial conduits 25, into the third pressure chamber 14, as a result of which the second piston 6 is acted upon as well. As soon as the pressure building up in the third pressure chamber 14 is greater than the pressure that until then has been decreasing in braked fashion in the second pressure chamber 13, the ventilation slide 27 is thrust by the thrust piston 30 toward the second pressure chamber 13. As a result, the ventilation conduit 28 is opened, so that the air can then flow out of the second pressure chamber 13 without being throttled. The electrode 31 is then pressed against the workpiece with the full force of the compressed air acting on both pistons 5, 6, and the welding operation is executed.

For the return stroke, the second pressure chamber 13 is acted upon with compressed air through the second air line connection 16, the annular conduit 17 and the connecting conduit 18, while the throttle valve 19 opens. The first piston 5 is initially displaced under the pressure of the helical compression spring 23 into its initial position on the end segment 4b of the piston rod and then, in common with this and with the second piston 6, it is thrust against the cylinder bottom 7 into the initial position, in order to be ready for a new welding operation. In this process the first pressure chamber 12 is vented directly through the then pressureless air line connection 15. Venting of the third pressure chamber 14 is effected through the radial conduits 25, the axial conduit 20 of the piston rod, and the check valve 21 located on the end segment 4b of the piston rod, which then opens into the first pressure chamber 12.

The return stroke is ended and the drive is ready for a new working stroke whenever the moving parts have resumed the position shown in the drawing.

We claim:

1. A pneumatically actuatable linear drive for automatic spot welding machines, comprising:
    a) a cylinder having ends, a piston rod, first and second pistons guided in tandem on said piston rod in said cylinder, a cylinder bottom closing one of said ends of said cylinder, a guide ring being disposed in the vicinity of the other of said ends of said cylinder and being penetrated by said piston rod; an intermediate bottom being attached to said cylinder between said pistons and being penetrated by said piston rod, said cylinder being divided into at least a first pressure chamber between said cylinder bottom and said first piston, a second pressure chamber between said first piston and said intermediate bottom, and a third pressure chamber between said second piston and said intermediate bottom;

b) said piston rod having a first segment and a second end segment extending between said pistons, an axial conduit being disposed in said segments and having an end facing toward said cylinder bottom, a check valve disposed at said end of said axial conduit for conducting a discharge from said axial conduit into said first pressure chamber, radial conduits communicating between said axial conduit and said first and third pressure chambers, a throttle valve, said cylinder having a first air line connection leading into said first pressure chamber and communicating with said third pressure chamber, and a second air line connection leading into said second pressure chamber through said throttle valve;

c) said second end segment having a smaller diameter than said first segment defining a shoulder between said segments, said first piston being disposed on said second end segment for axial movement toward said cylinder bottom into an end position closing said radial conduits leading out of said axial conduit into said first pressure chamber and away from said cylinder bottom into a terminal position opening said radial conduits leading out of said axial conduit into said first pressure chamber, d) a helical compression spring axially surrounding said second end segment with prestressing between said first piston and said shoulder; said check valve having a housing disposed on said second end segment in the form of a cap screw with an axially parallel conduit disposed therein; said end position of movement of said first piston toward said cylinder bottom being determined by said housing, and said terminal position of movement of said first piston away from said cylinder bottom being defined by a maximum compression of said helical compression spring;

e) a connecting conduit containing said throttle valve, at least said intermediate bottom having a peripheral annular conduit communicating directly with said second air line connection and communicating through said connecting conduit with said second pressure chamber;

f) at least said intermediate bottom having a peripheral region with an at least approximately axially parallel extending slide cylinder being open toward said second and third pressure chambers, a ventilation conduit extending in said intermediate bottom, connecting said second pressure chamber to said annular conduit and intersecting said slide cylinder, and a ventilation slide being axially movable as a function of pressure differences between said second pressure chamber and said third pressure chamber for blocking off said ventilation conduit.

2. The pneumatically actuatable linear drive according to claim 1, wherein said cylinder has an axis, said cap screw is a valve seat for said check valve, and said check valve is a diaphragm valve disposed on said second end segment of said piston rod having a diaphragm disposed on said valve seat perpendicular to the axis of said cylinder.

3. The pneumatically actuatable linear drive according to claim 1, wherein said slide cylinder has a given cross section, said ventilation slide is a cylinder filling said given cross section and having an end surface facing toward said third pressure chamber, and including a thrust piston being axially movable in axial extension in said slide cylinder, and a spacer pin positioned axially against said end surface and connecting said ventilation slide to said thrust piston.

4. A pneumatically actuatable linear drive for automatic spot welding machines, comprising:

a) a cylinder having a closed end, a piston rod, first and second pistons on said piston rod in said cylinder; an intermediate bottom being attached to said cylinder between said pistons and being penetrated by said piston rod, said cylinder being divided into at least a first pressure chamber between said closed end and said first piston, a second pressure chamber between said first piston and said intermediate bottom, and a third pressure chamber between said second piston and said intermediate bottom;

b) said piston rod having first and second segments between said pistons with a shoulder between said segments, an axial conduit being disposed in said segments and having an end facing toward said closed end, a check valve disposed at said end of said axial conduit for conducting a discharge from said axial conduit into said first pressure chamber, radial conduits communicating between said axial conduit and said first and third pressure chambers, a throttle valve, said cylinder having a first air line connection leading into said first pressure chamber and communicating with said third pressure chamber, and a second air line connection leading into said second pressure chamber through said throttle valve;

c) said first piston being disposed on said second segment for axial movement toward said closed end into an end position closing said radial conduits leading out of said axial conduit into said first pressure chamber and away from said closed end into a terminal position opening said radial conduits leading out of said axial conduit into said first pressure chamber, d) a spring disposed on said second segment between said first piston and said shoulder; said check valve having a cap screw with an axially parallel conduit disposed therein; said end position of said first piston being determined by said cap screw, and said terminal position of said first piston being defined by a maximum compression of said spring;

e) a connecting conduit containing said throttle valve, at least said intermediate bottom having a peripheral annular conduit communicating with said second air line connection and communicating through said connecting conduit with said second pressure chamber;

f) said intermediate bottom having a slide cylinder being open toward said second and third pressure chambers, a ventilation conduit in said intermediate bottom, connecting said second pressure chamber to said annular conduit and intersecting said slide cylinder, and a ventilation slide being axially movable as a function of pressure differences between said second pressure chamber and said third pressure chamber for blocking off said ventilation conduit.

* * * * *